(12) United States Patent
Toombs et al.

(10) Patent No.: US 6,349,678 B1
(45) Date of Patent: *Feb. 26, 2002

(54) CARBON BLACK TAILGAS FUELED RECIPROCATING ENGINES

(75) Inventors: Alvin E. Toombs, Phippsburg, ME (US); Edward D. Stowell, Tarpoley (GB)

(73) Assignee: Cabot Corporation, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/653,020

(22) Filed: Sep. 1, 2000

Related U.S. Application Data

(63) Continuation of application No. 08/738,716, filed on Oct. 28, 1996.

(51) Int. Cl.$^7$ ................................................ F02B 43/00
(52) U.S. Cl. ........................................................ 123/3
(58) Field of Search ........................... 123/1 A, 3, 525, 123/527, 27 GE, 568.12, 568.15; 423/449.1, 449.2, 449.3, 449.4, 459; 585/910; 60/599, 605.2

(56) References Cited

U.S. PATENT DOCUMENTS

| | | | | |
|---|---|---|---|---|
| 3,828,736 A | * | 8/1974 | Koch | 126/200 |
| 3,861,885 A | * | 1/1975 | Schora | 44/574 |
| 3,918,412 A | * | 11/1975 | Lindstrom | 123/3 |
| 3,939,806 A | * | 2/1976 | Bradley | 123/3 |
| 3,982,910 A | * | 9/1976 | Housemen et al. | 48/61 |
| 4,003,345 A | * | 1/1977 | Bradley | 123/3 |
| 4,033,133 A | * | 7/1977 | Houseman et al. | 60/605 |
| 4,086,877 A | * | 5/1978 | Henkel et al. | 123/1 A |
| 4,161,164 A | * | 7/1979 | Mühlberg | 123/551 |
| 4,185,083 A | * | 1/1980 | Walker | 423/460 |
| 4,185,595 A | * | 1/1980 | Muhlberg | 123/3 |
| 4,202,167 A | * | 5/1980 | Suggitt et al. | 60/39.02 |
| 4,255,129 A | | 3/1981 | Reed et al. | |
| 4,261,964 A | | 4/1981 | Scott, IV et al. | |
| 4,282,199 A | | 8/1981 | Lamond et al. | |
| 4,284,616 A | | 8/1981 | Solbakken et al. | |
| 4,340,013 A | * | 7/1982 | Lindstrom | 123/3 |
| 4,460,558 A | * | 7/1984 | Johnson | 423/450 |
| 4,542,007 A | * | 9/1985 | Murray | 423/450 |
| 4,570,603 A | * | 2/1986 | Piedlrafita | 123/570 |
| 4,576,005 A | * | 3/1986 | Force | 60/618 |
| 4,722,303 A | * | 2/1988 | Leonhard | 123/3 |
| 4,740,222 A | | 4/1988 | Mehra | |
| 4,839,151 A | | 6/1989 | Apffel | |
| 4,907,565 A | * | 3/1990 | Bailey et al. | 123/23 |
| 5,011,670 A | * | 4/1991 | Davis et al. | 423/450 |
| 5,165,224 A | * | 11/1992 | Spadaccini et al. | 60/39.02 |
| 5,343,699 A | * | 9/1994 | McAlister | 60/273 |
| 5,611,204 A | * | 3/1997 | Radovanovic et al. | 60/605.2 |
| 5,617,726 A | * | 4/1997 | Sheridan et al. | 60/605.2 |
| 5,657,630 A | * | 8/1997 | Kjemtrup et al. | 60/605.2 |
| 5,671,600 A | * | 9/1997 | Pischinger et al. | 60/605.2 |
| 5,692,458 A | * | 12/1997 | Green | 123/3 |
| 5,740,786 A | * | 4/1998 | Gärtner | 123/568.12 |
| 5,771,868 A | * | 6/1998 | Khair | 123/568.12 |
| 6,086,841 A | * | 7/2000 | Lee | 423/449.1 |
| 6,182,614 B1 | * | 2/2001 | Toombs et al. | 123/3 |

FOREIGN PATENT DOCUMENTS

| | | |
|---|---|---|
| EP | 0 078 759 | 5/1983 |
| EP | 0 103 065 | 3/1984 |
| EP | 0 120 743 | 10/1984 |
| EP | 0 177 930 | 4/1986 |
| GB | 925914 | 5/1963 |
| WO | WO 95/02757 | 1/1995 |
| WO | WO 98/19059 | 5/1998 |

* cited by examiner

Primary Examiner—Willis R. Wolfe
Assistant Examiner—Hai Huynh

(57) ABSTRACT

A system and process for utilizing tail gas from a carbon black manufacturing process as a fuel in a reciprocating engine. The tailgas is dewatered and mixed with air to form a fuel gas. The fuel gas is pressure charged and then ignited in the reciprocating engine to derive useful work.

20 Claims, 14 Drawing Sheets

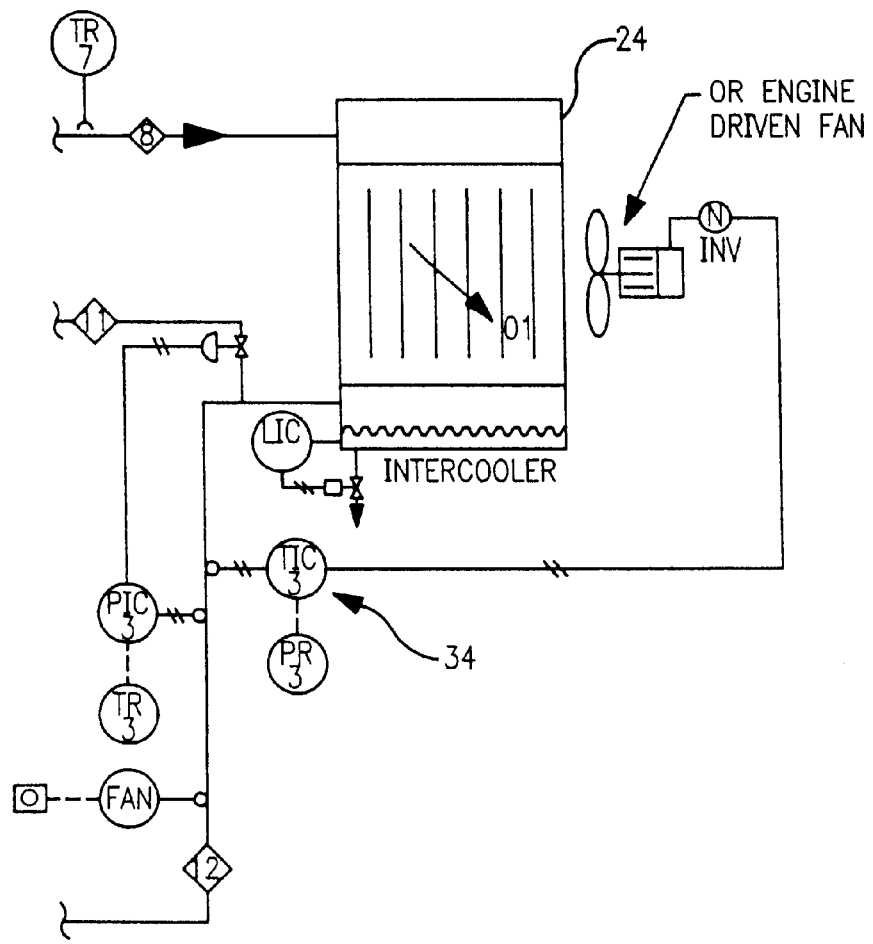
FIG. IC

CARBON BLACK TAILGAS FUELED RECIPROCATING ENGINES

This application is a continuation of U.S. application Ser. No. 08/738,716, filed Oct. 28, 1996.

FIELD OF THE INVENTION

This invention relates to the use of a process tailgas (low specific heating value gas) from the manufacture of carbon black for fueling a reciprocating engine.

BACKGROUND OF THE INVENTION

Internal combustion reciprocating engines have been used for many years as electric power generation prime movers or directly for supplying industrial power needs. In these applications they are normally fueled by natural gas, diesel fuel or other conventional fuels. In some cases they are also fueled by combustible process gases produced as a byproduct from other manufacturing processes. In these cases the specific heating value of the process tailgas has typically been greater than 150 British thermal units (Btu) per standard cubic foot of gas (scf).

The tailgas produced as a byproduct of carbon black manufacture is typically composed of the following:

| | |
|---|---|
| Hydrogen | 6.5%–12% |
| Carbon Monoxide | 6.5%–12% |
| Nitrogen | 30%–62% |
| Water | 30%–45% |
| Acetylene and Higher Hydrocarbons | less than 1% |

While the acetylene and higher hydrocarbons make up less than 1% of the tailgas by volume, they account for nearly 10% of the heating value of the tailgas.

The relative amounts of hydrogen and carbon monoxide can vary with the feedstock used and the carbon black grade produced but the heating value of the tailgas produced will usually be in the range of 50–65 Btu per scf as it leaves the process.

Historically, spark ignited reciprocating engines utilizing gaseous fuels have operated with air/fuel ratios slightly leaner than stoichiometric ratios and have been designed with natural gas as the base fuel. Natural gas typically has a net heating value of approximately 900 Btu per scf. When a fuel with a significantly lower specific heating value is used, the engine is not be able to achieve its rated capacity.

Recently, industrial reciprocating engines have been designed to operate with much leaner fuel mixtures in order to reduce emissions of nitrous oxides. The premise is that by increasing the uncombusted mass flowing through the cylinder, the peak combustion temperature is suppressed which in turn suppresses the formation of the nitrous oxides.

It has been discovered that the tailgas from a carbon black manufacturing process can itself be processed and used as a fuel in an industrial reciprocating engine.

SUMMARY OF THE INVENTION

Broadly, the invention embodies the formation and use of a fuel gas for a reciprocating engine, which fuel gas comprises a mixture of a low specific heating value gas mixed with combustion air approaching a stoichiometric ratio. Such a fuel gas can achieve a mass flow suitable for modern reciprocating engine designs and surprisingly has sufficient energy content to allow for near full rated engine capacity.

The low specific heating value gas, initially having a heating value of approximately 50–55 Btu/scf, is the primary component in a fuel gas for a reciprocating engine. The low specific heating value gas is conditioned, if necessary, to remove water vapor thereby forming a treated gas with a heating value of approximately 90–110 Btu/scf. The treated gas is mixed with combustion air to form the fuel gas which fuel gas is used in a reciprocating engine. Preferably, the low specific heating value gas comprises hydrogen and carbon monoxide within certain defined percent ranges.

In a preferred embodiment carbon black tailgas is used as the low specific heating value gas. The tailgas can contain as much as 45% water vapor which when reduced to about 5% water vapor increases the specific heating value to the 90–110 Btu per scf range. Because the major variation in tailgas composition among various carbon black grades is due to differences in water content, the heating value of the dewatered tailgas is relatively consistent. The principle components of the tailgas that provide the fuel value are hydrogen and carbon monoxide. Individually these gases are poor candidates for a reciprocating engine fuel. The hydrogen burns too fast and the carbon monoxide burns too slow. The fuel gas of the invention ignites and burns much more readily than carbon monoxide alone while not exhibiting the tendency of hydrogen to burn rapidly with a fast pressure rise (similar to detonation).

In a particularly preferred embodiment of the invention tailgas from a carbon black manufacturing process is dried or dewatered to increase its heating value from about 50–65 Btu/scf to about 90–110 Btu/scf. This dried gas is mixed with combustion air to form the fuel gas. The fuel gas is turbocharged, subsequently cooled and introduced into the engine manifold and ignited. The combustion gases from the engine are used to drive the turbocharger.

BRIEF DESCRIPTION OF THE DRAWINGS

FIGS. 1A–1C are a process flow diagram of a spark ignition system embodying the invention;

DESCRIPTION OF THE PREFERRED EMBODIMENT(S)

Figure 1A:
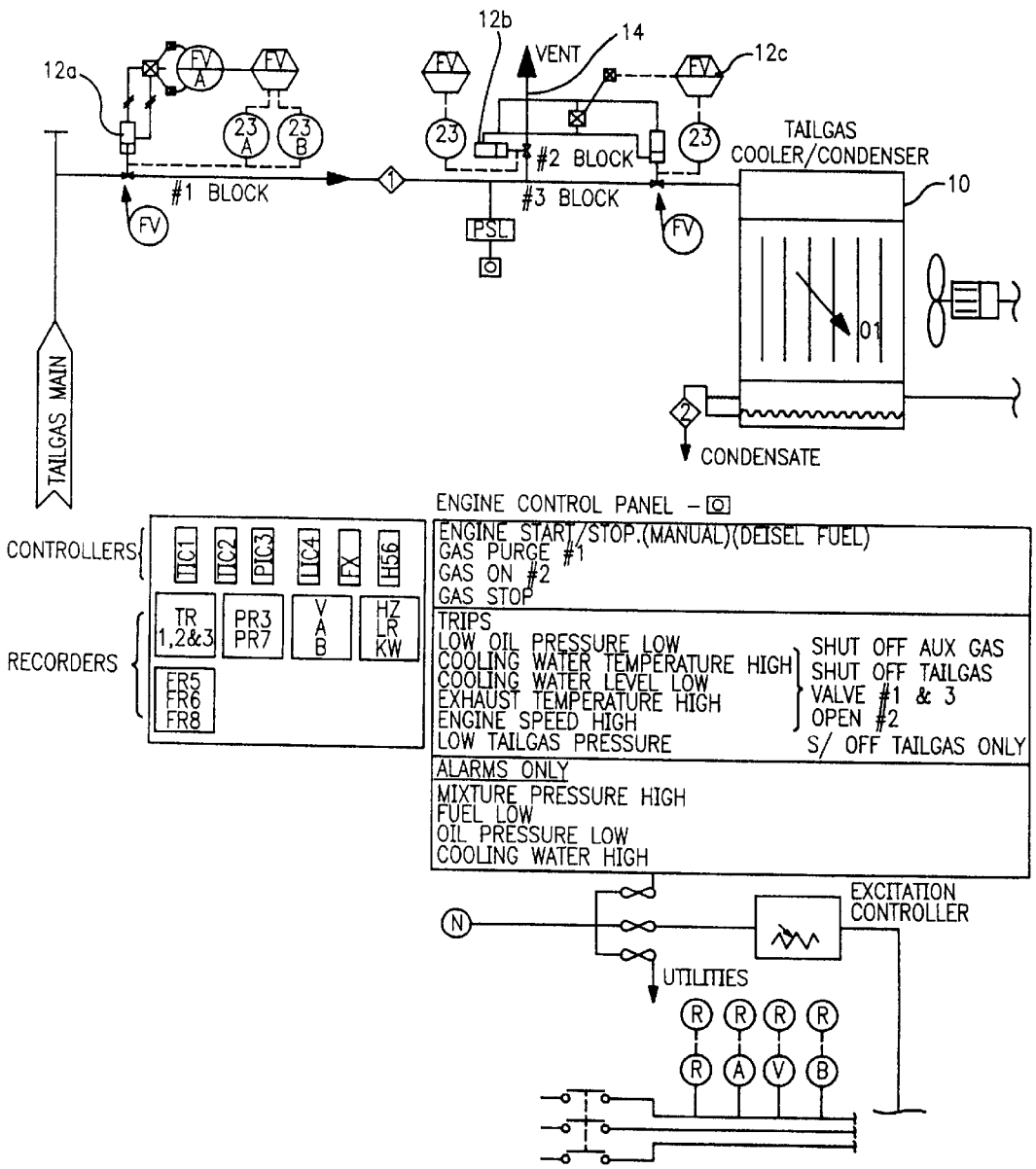
Figure 1B:
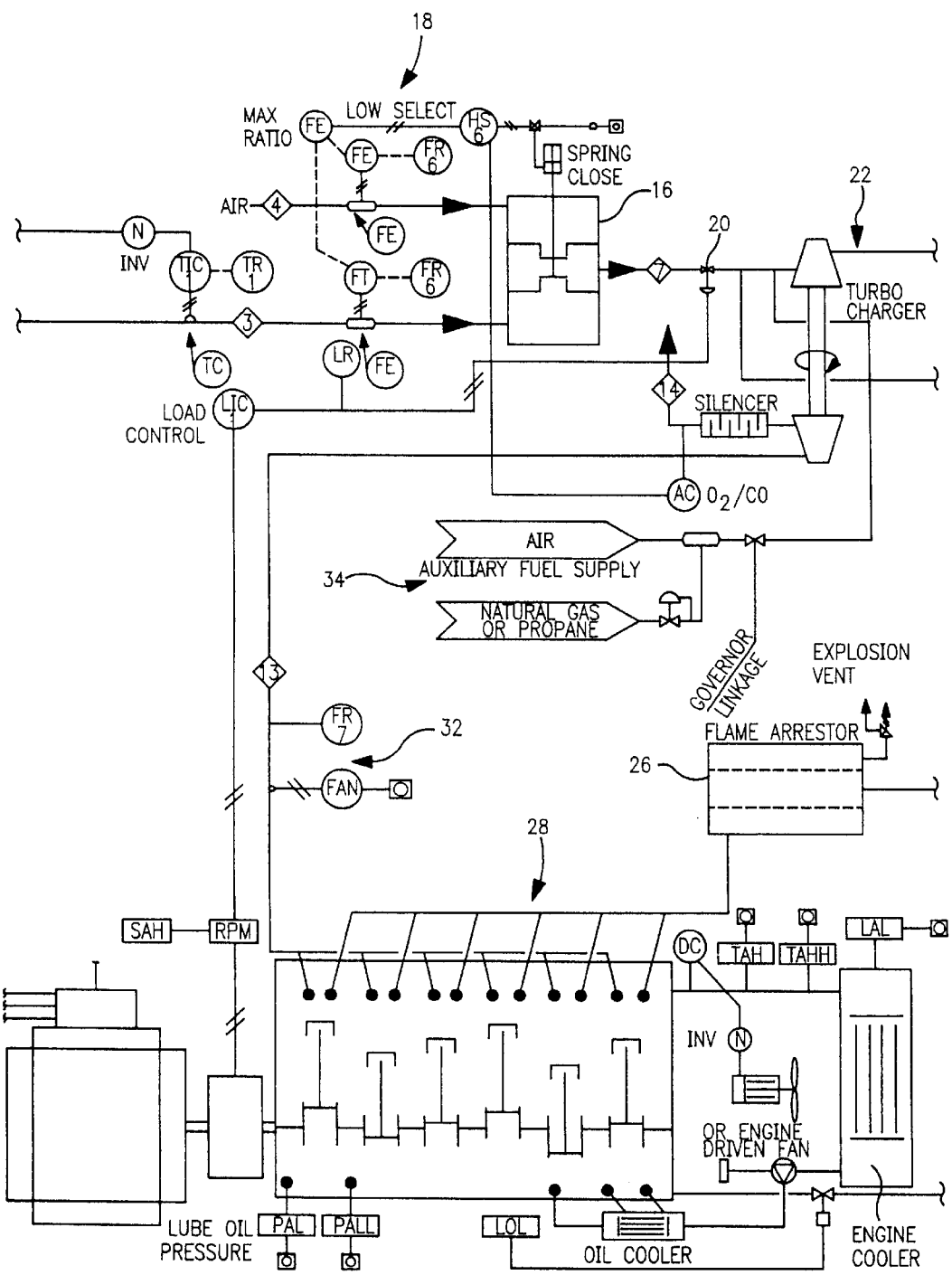

Referring to FIGS. 1A–1C, a process flow diagram of the preferred embodiment of the invention is shown.

Carbon black tailgas is brought from a main tailgas header (not shown) to an air blast cooler/condenser 10 via a set of block valves 12a and 12c with an additional block valve 12b leading to a vent 14 (which provide sufficient isolation in order to perform maintenance on any downstream systems). The tailgas composition is typically carbon monoxide and hydrogen each 6.5 to 12%, 5% water vapor, trace amounts of acetylene and higher hydrocarbons the remainder nitrogen.

The tailgas enters the cooler/condenser 10 at a temperature of approximately 450° F., containing between 35 and 45 percent water vapor and with a net heating value in the range of 50 to 65 Btu per scf.

Leaving the cooler/condenser 10 the treated tailgas is approximately 100 to 110° F. with a moisture content in the range of 5 to 10 percent and a net heating value of 90 to 110 Btu per scf. The relative humidity will be 100 percent at this point in the process. Condensate removed from the tailgas in the cooler/condenser is recycled to the carbon black production process.

The treated tailgas flows into a mixing valve 16 and is mixed with air in a ratio of approximately 1 to 1 treated tailgas/air to form a fuel gas for combustion in a reciprocating engine 30. The treated tailgas/air ratio can vary somewhat to account for variations in tailgas heating value. The mixing valve 16 is controlled by sensors shown generally at 18 to insure the proper gas/air mixture. Further, the mixing valve is designed in such a manner to minimize the pressure losses during mixing as well as being designed to withstand the corrosive environment associated with the saturated tailgas.

The fuel gas flows through a flow control valve 20 (for speed and/or load control) at near atmospheric pressure (and at a rate of approximately 6500 cubic feet per minute (scfm) for a 3 mw engine generator set. The fuel gas has its pressure boosted by the turbocharger 22 from 1 bar to about 25 bar. The fuel gas from the turbocharger 22 flows through an intercooler 24 (sometimes referred to as an aftercooler) and is discharged at a temperature in the range of 120° F. to 200° F. This temperature would be adjusted to maximize engine efficiency while preventing knock.

The fuel gas then flows through a flame arrester 26 and into the manifold 28 of the engine 30 where it is ignited driving the engine. Following combustion, the exhaust gases flow to the turbocharger 22 from the engine 30.

Engine controls, in addition to the tailgas/air flow mixing at 16, are used in order to enhance the performance of the engine using the fuel gas. A turbocharger boost pressure control 32 controls recirculation of engine combustion gases to the inlet of the turbocharger 22 from the engine 30. Higher boost pressures will allow higher mass flow per unit of engine volume thus higher power output, but the associated higher temperatures will make detonation (knock) more likely. However, increased intercooling can reduce this temperature and reduce the likelihood of knock. This cooling is controlled by the temperature controller 34. An optional auxiliary fuel supply 36, either air, natural gas, propane or similar LPG fuel can be used as desired.

EXAMPLE

In tests conducted using a Ricardo single cylinder spark ignition test engine with a synthetic tailgas fuel composed of 15% hydrogen, 17% carbon monoxide and 68% nitrogen, initial results indicate that the engine can achieve full rated capacity by pressure charging the fuel/air mixture. The initial tests also demonstrate that the synthetic tailgas (and by extrapolation, the actual dewatered carbon black production tailgas) is a tractable fuel with neither of the problems typically associated with the primary constituent products. In the tests, no problems were encountered due to the rapid reaction rate of hydrogen nor from the long burning time normally associated with carbon monoxide. It appears that the hydrogen assists with causing the carbon monoxide to burn more readily and the carbon monoxide acts to suppress the rapid reaction of hydrogen.

Figure 2A:
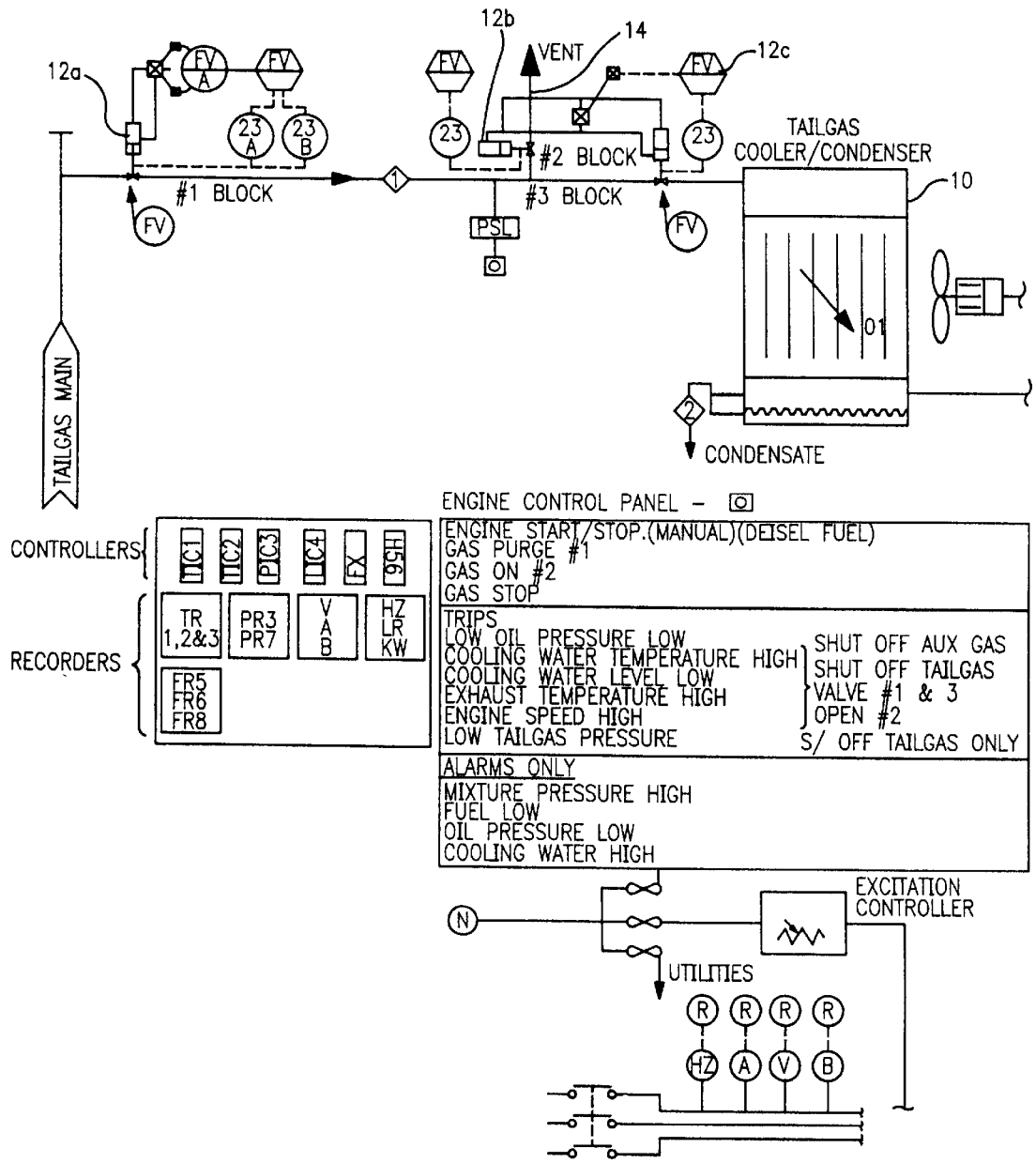
FIGS. 2A–2C are a process flow diagram of a compression ignition system of the invention.
Figure 2B:
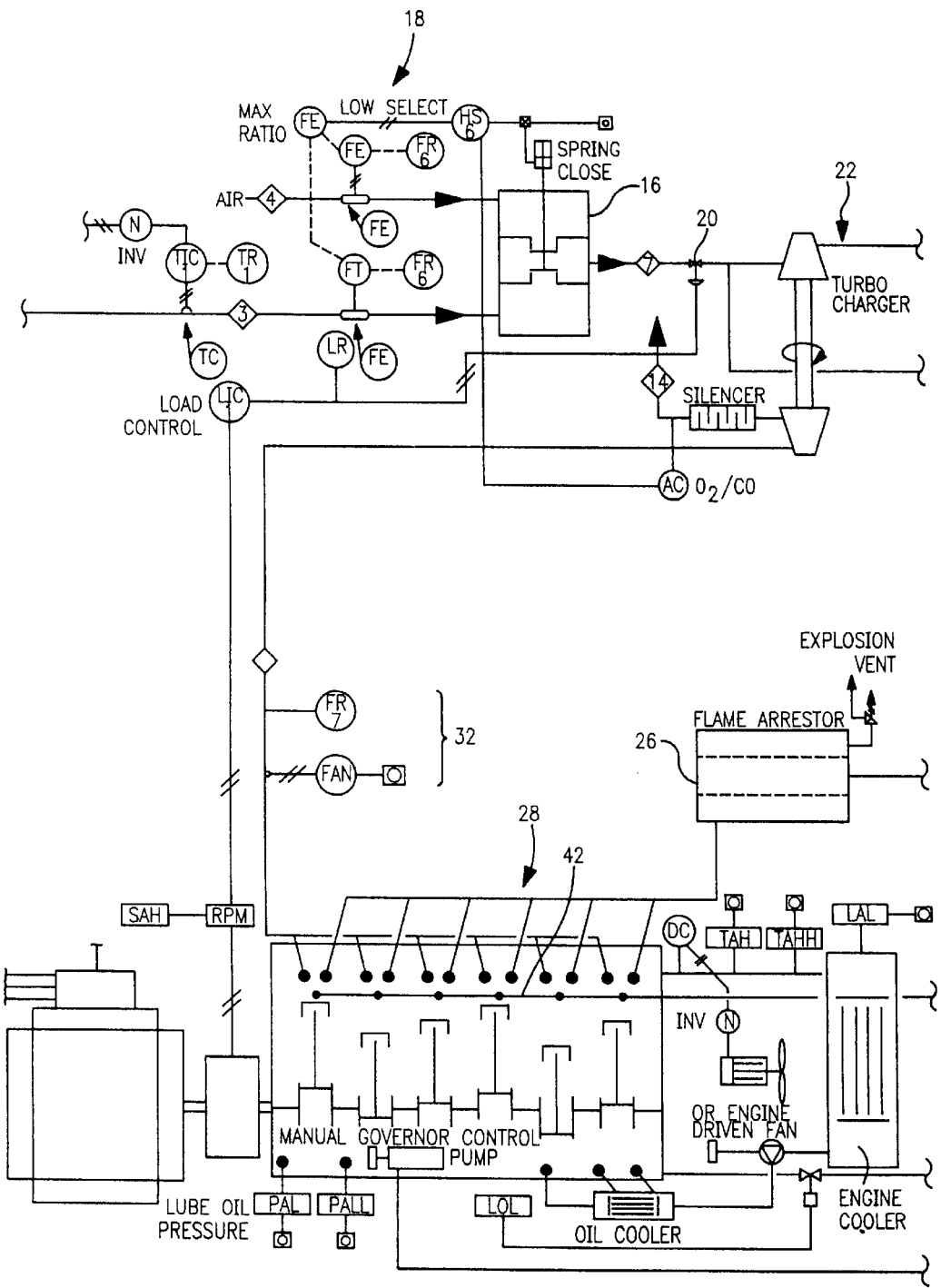
Figure 2C:
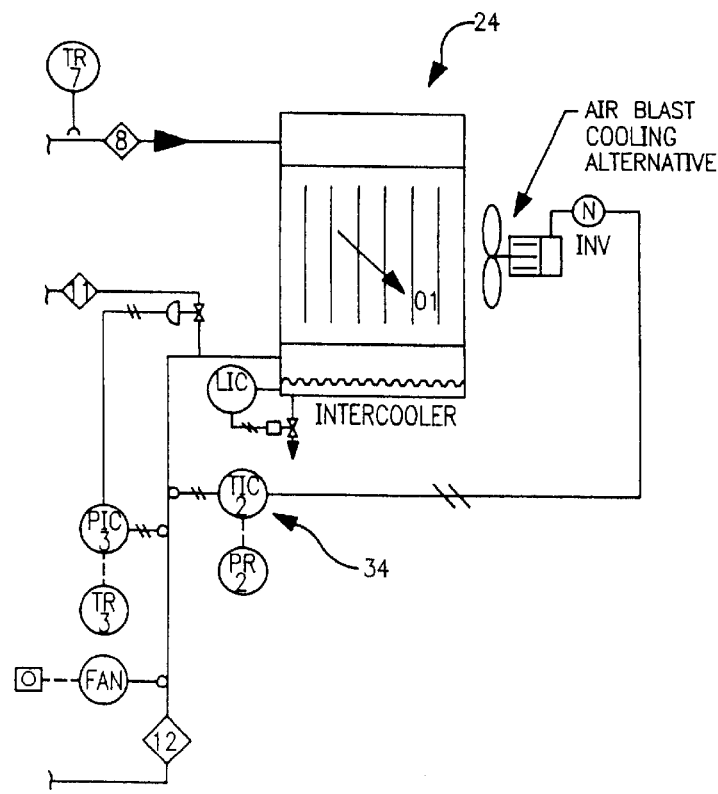
Figure 2C:
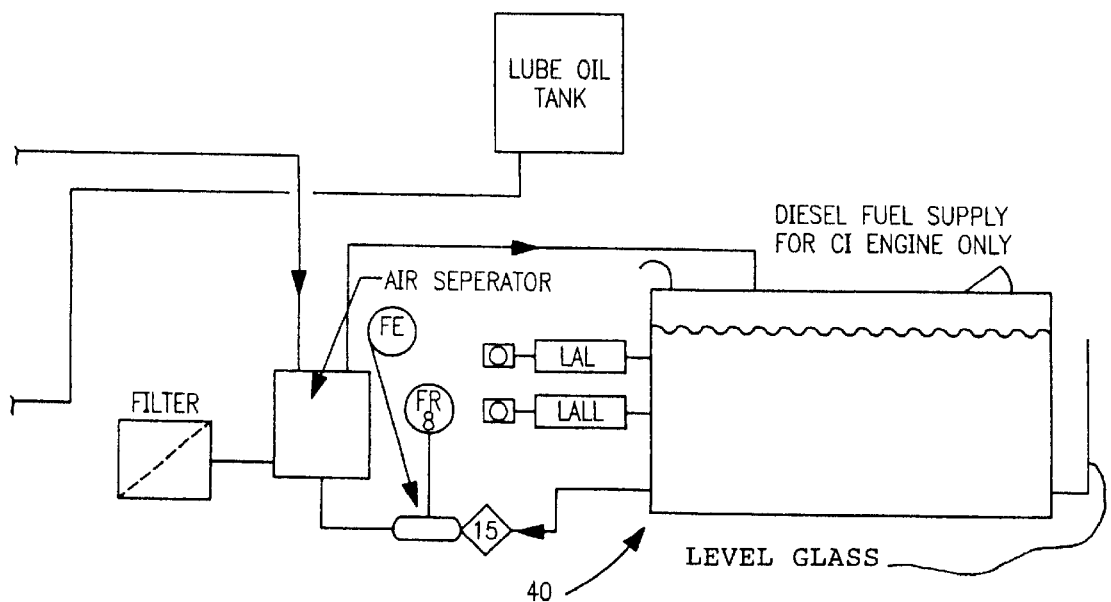

An alternative embodiment of the invention for compression ignition is shown in FIGS. 2A–2C, with like components numbered as in FIGS. 1A–1C. The overall operation is similar to that described for FIGS. 1A–1C. In this embodiment, the fuel gas is supplied to the engine intake manifold 28 where it is introduced into the cylinder in the same manner as in the spark ignition embodiment. The fuel gas is ignited by a small amount of a pilot fuel injected in the same way as it would have been if the engine were operated as a pure compression ignition engine. The diesel fuel (auxiliary fuel supply) from a source 40 is injected into the combustion chambers via injectors 42. Other auxiliary fuels such as heavy fuel oil or other conventional diesel engine fuels can be used. The quantity of diesel fuel used as a pilot is considerably less than the low heating value fuel and is on the order of 1% to 10% of the total fuel supplied to the engine. Alternatively the system can function solely on diesel fuel. In this embodiment. the engine speed or load control is controlled by varying the amount of liquid pilot diesel fuel injected into the combustion chambers (there is no flow control valve such as the valve 20 in FIGS. 1A–1C). The advantages of the compression engine is that this type engine can typically be made much larger than a spark ignition engine, i.e. up to 20 megawatts capacity. Spark ignition engines typically are limited to 5 to 10 megawatts capacity due to the limited amount of ignition energy that can practically be supplied via a spark system.

The cooling/condensing. intercooling and boost pressure control steps shown in FIGS. 1A–1C and 2A–2C can be varied.

Figure 3A:
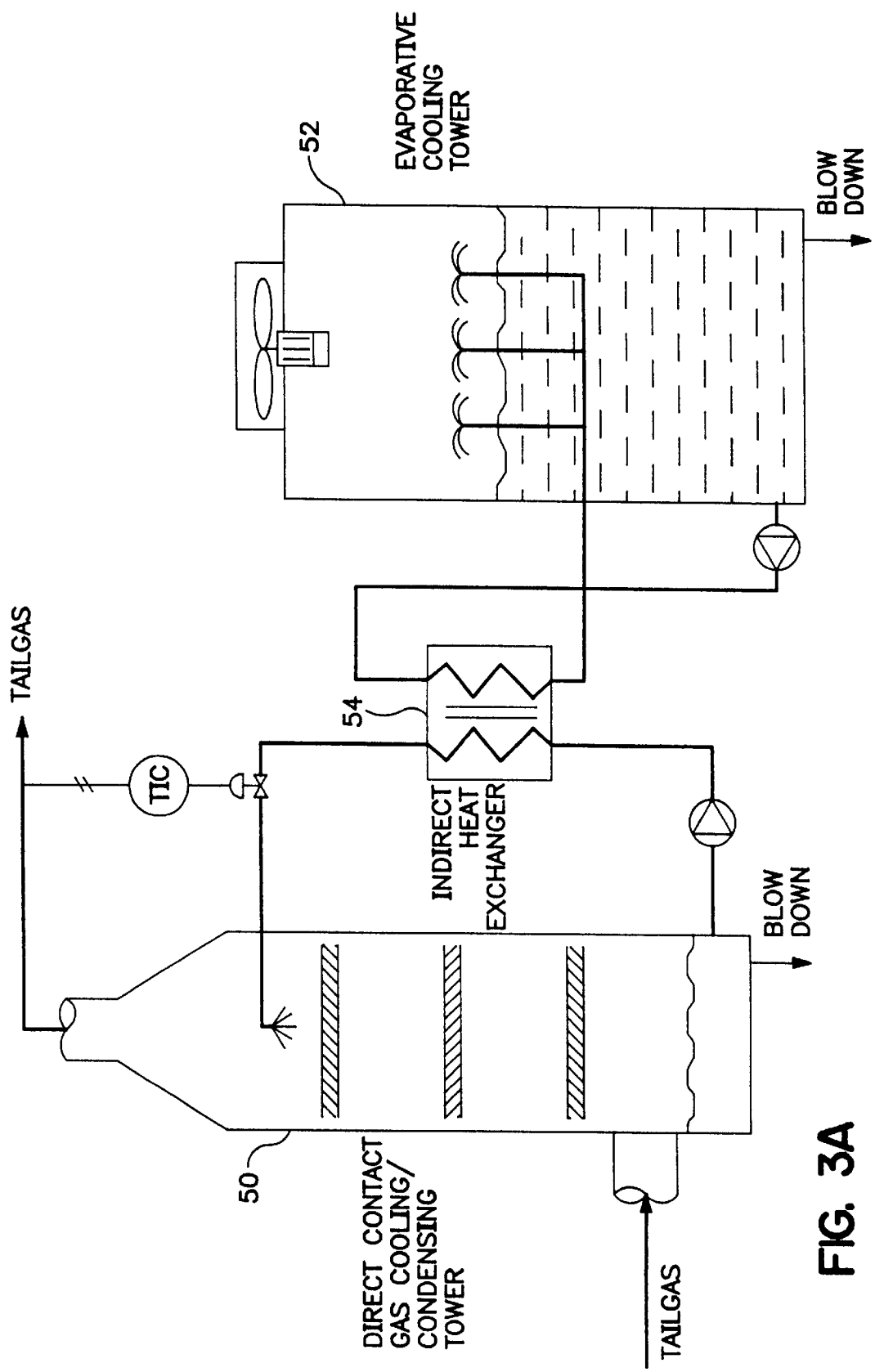
FIGS. 3a, 3b, 3c and 3d are alternative embodiments of tailgas cooling/condensing designs.

Referring to FIG. 3a, an alternate embodiment for the tailgas cooling/condensation employs a packed direct contact cooling tower 50. The cooling water for the packed tower 50 is ultimately cooled using an evaporative cooling tower 52. A heat exchanger 54 is used between the packed tower cooling water 50 and the packed tower 52 because a portion of the gases contained in the tailgas could become dissolved in the cooling water. If this cooling water were cooled directly by the evaporative cooling tower, the gases would be released to the atmosphere untreated.

Figure 3B:
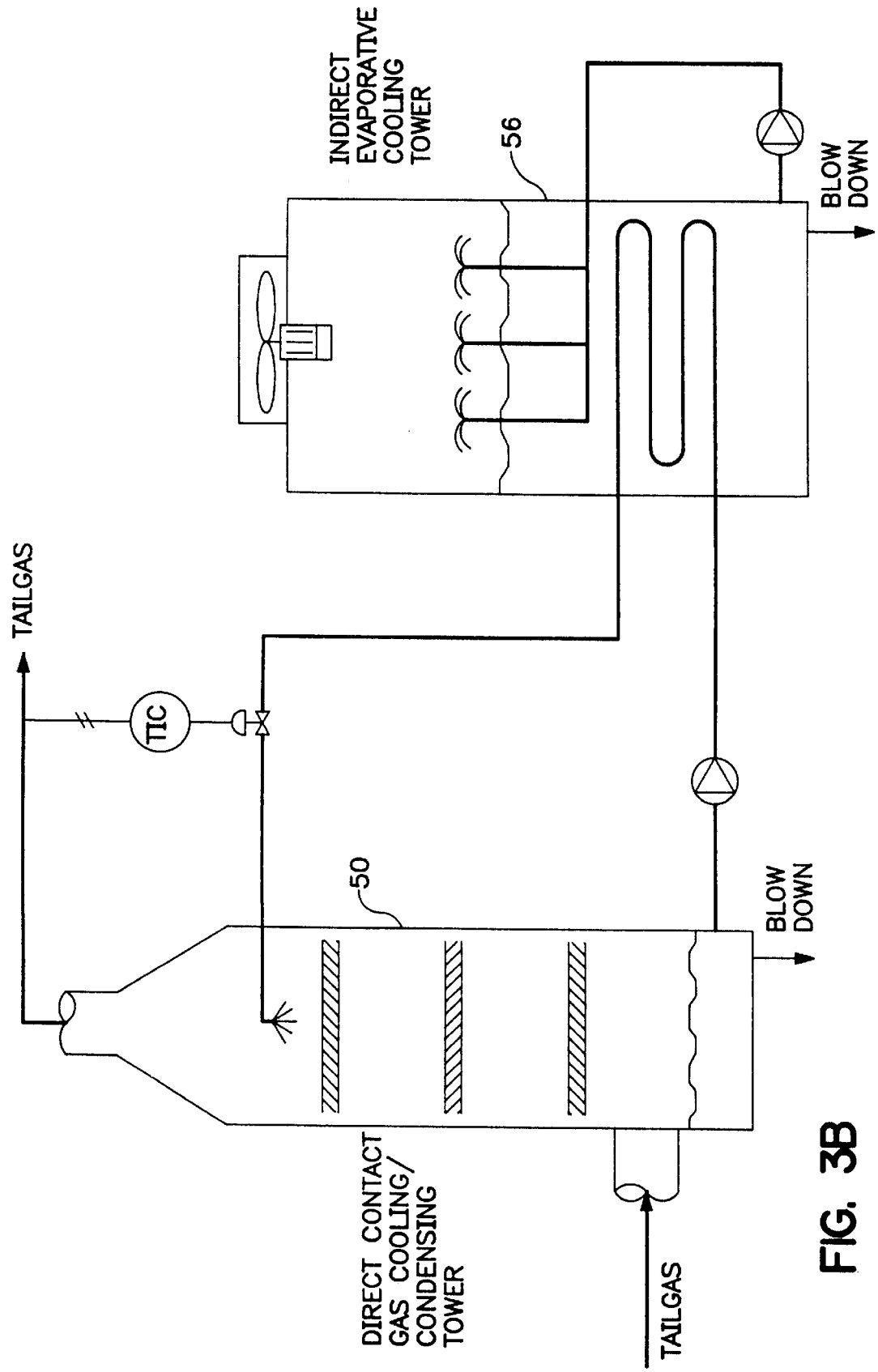

Referring to FIG. 3b, a further alternate embodiment for the tailgas cooling/condensation is similar to that shown in FIG. 3a except that it employs an indirect evaporative cooler 56 to cool the cooling water for the packed tower. The indirect cooler 56 does not allow any gases in the cooling water to become released to the atmosphere. In addition, the elimination of the intermediate heat exchanger allows a cooling water approach temperature closer to the atmospheric wet bulb temperature.

Figure 3C:
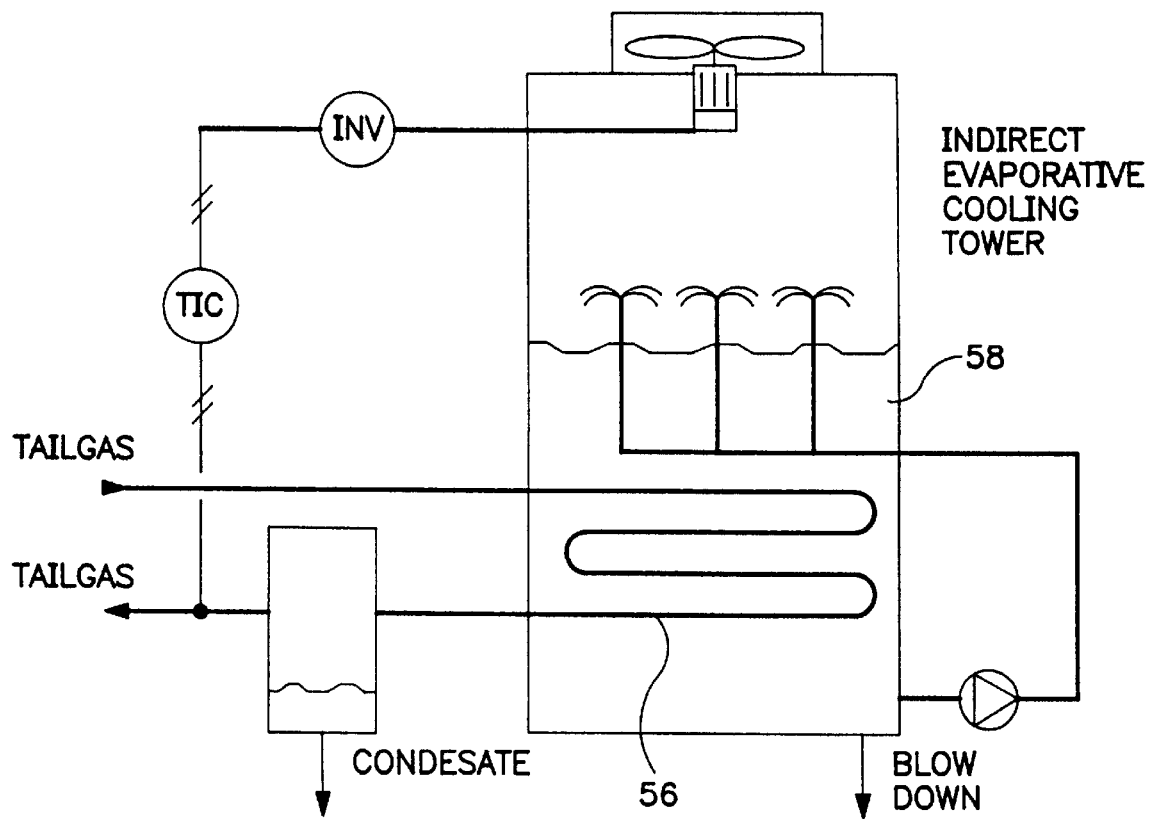

Referring to FIG. 3c, a still further alternative embodiment for the tailgas cooling/condensation is shown. The tailgas is cooled/condensed directly in heat exchange tubes 56 of an indirect evaporative cooling tower 58. The advantage of this embodiment is that the possible processed tailgas temperature is lower than in the embodiment described in FIG. 3a or 3b. The disadvantage is that the scrubbing action obtained from the packed tower is lost as is the dilution of the condensate from the tailgas. Because of the more concentrated condition of the tailgas condensate, material selection will be more important and more costly.

Figure 3D:
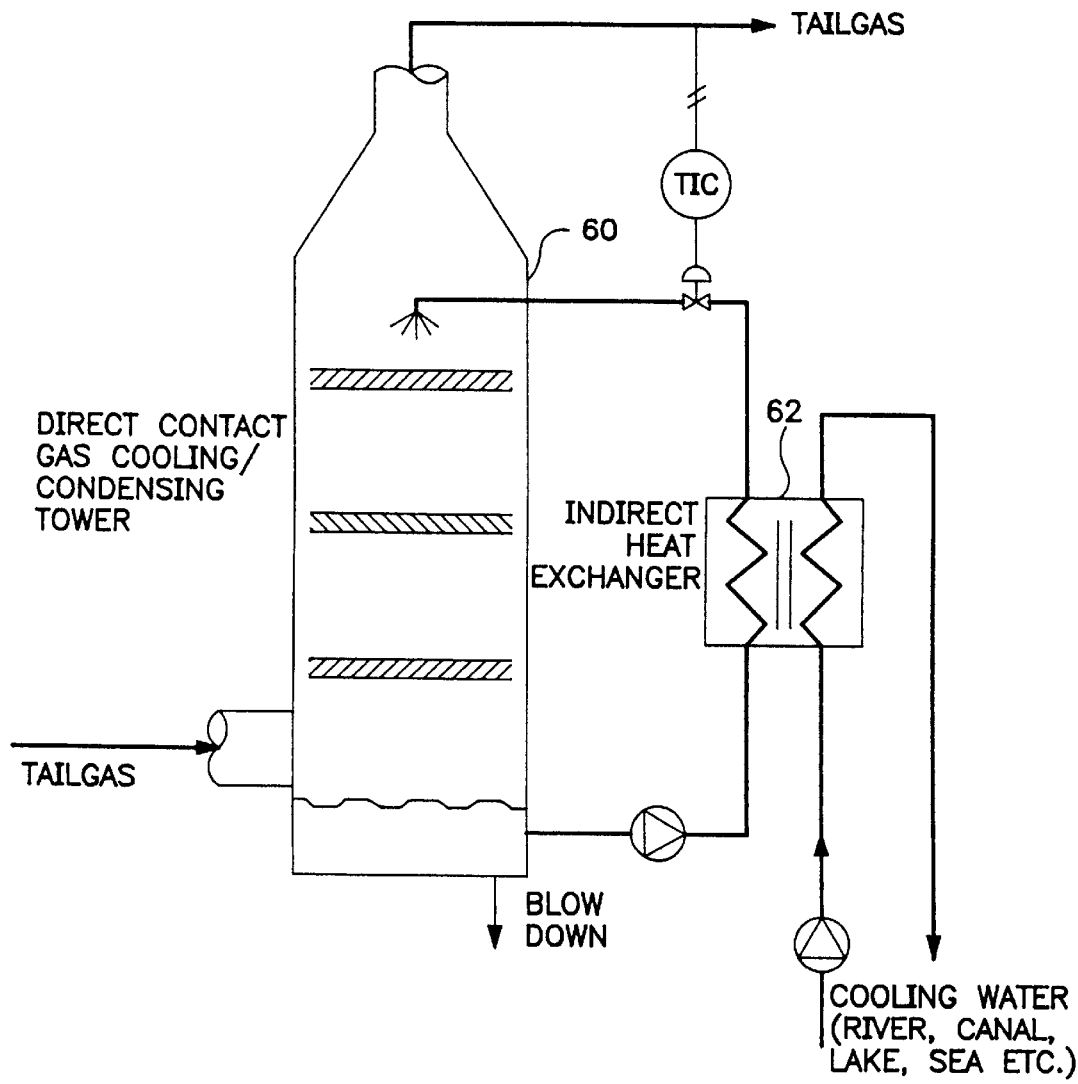

Referring to FIG. 3d, a still further alternative embodiment for the tailgas cooling/condensation is a packed tower 60 used to cool/condense the tailgas. The heat is ultimately dissipated in an external body of water acting as a heat sink. An indirect heat exchange system 62 is employed in order to prevent gases absorbed into the cooling water in the packed tower from being released to the atmosphere.

Figure 4A:
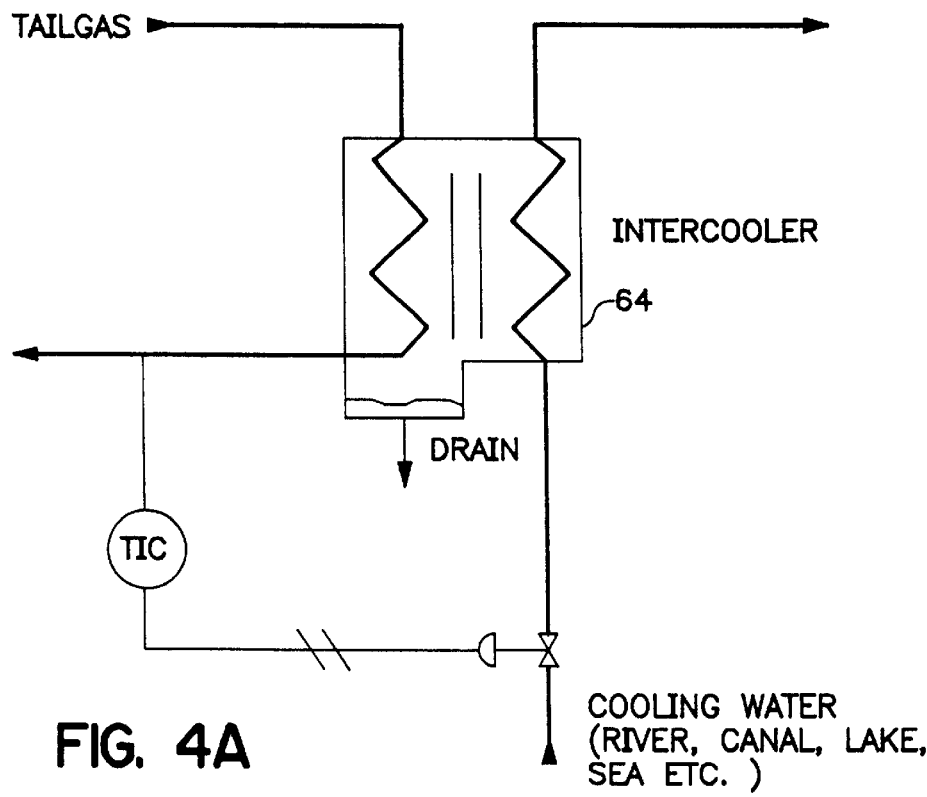
FIGS. 4a and 4b are process flow diagrams of alternative embodiments for intercooling/engine cooling designs.
Figure 4B:
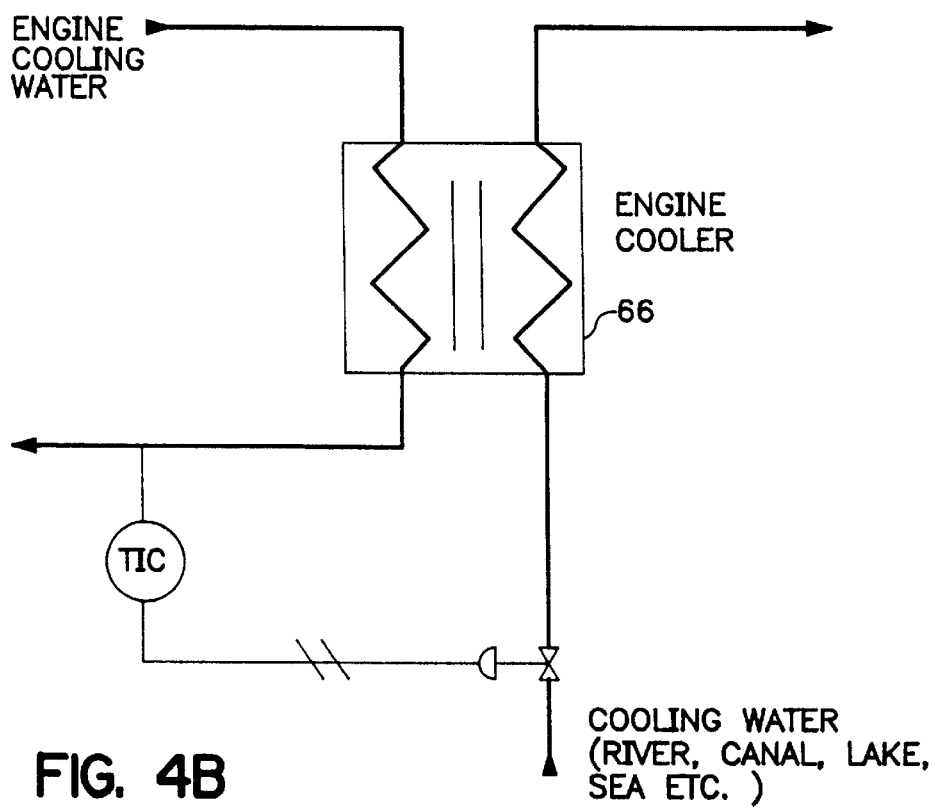

In another alternative embodiment of the invention, referring to FIGS. 4a and 4b, two cooling units 64 and 66 are shown using an external body of water as a heat sink. In both cases, a conventional cooling system is employed with the post turbocharged temperature of the fuel gas and the engine cooling water being controlled by the control of cooling water flow to the heat exchanger.

Figure 5:
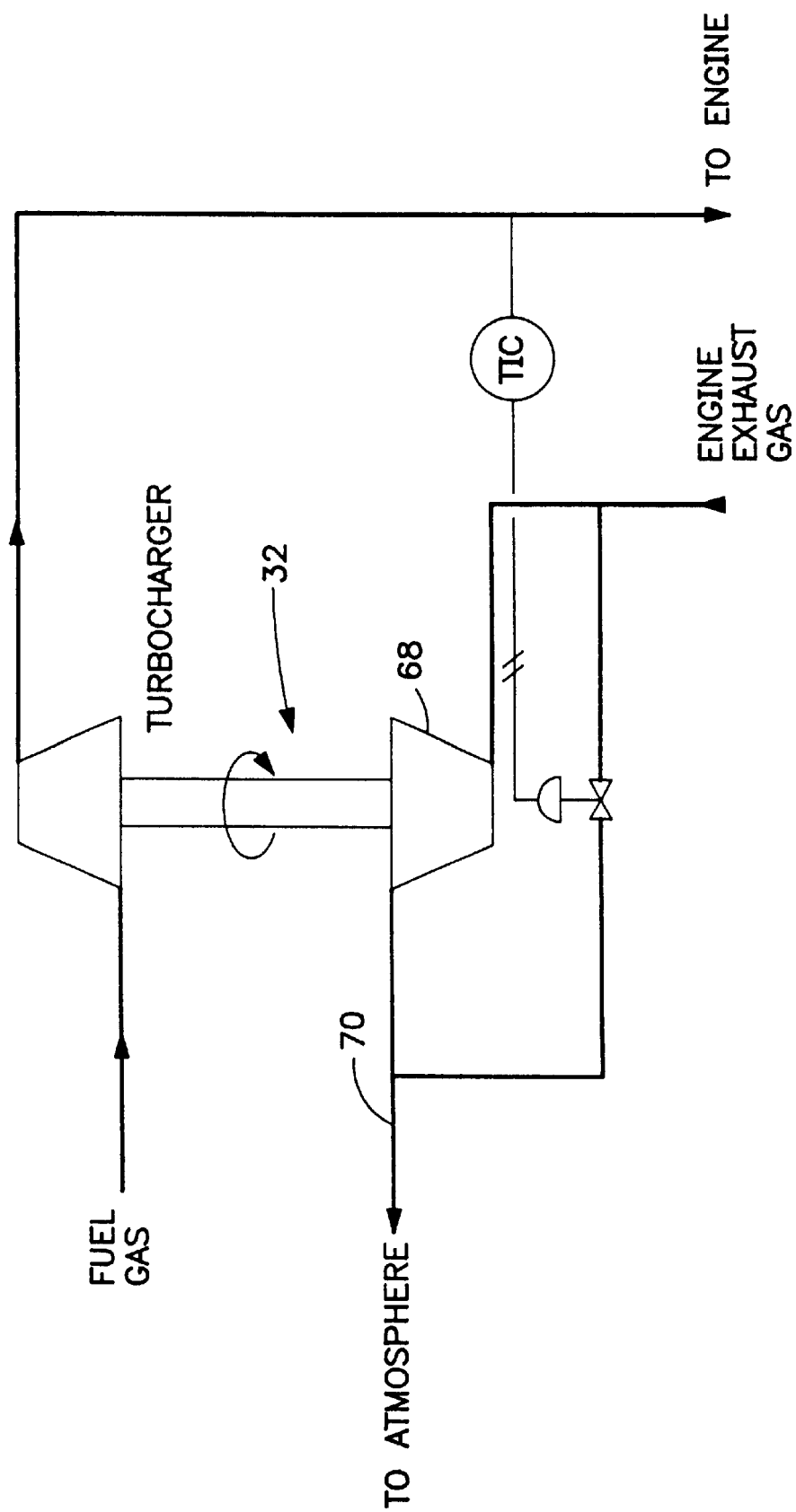
FIG. 5 is a process flow diagram of an alternative embodiment for boost pressure control.

In FIGS. 1A–1C. the engine exhaust boost pressure to the turbochargers is controlled by controlling the recirculation. In another alternative embodiment of the invention, FIG. 5, the boost is controlled by controlling the flow of engine exhaust into the turbine section 66 of the turbocharger 32. The exhaust not required for compression work is bypassed directly via an exhaust line 70 to atmosphere.

Figure 6:
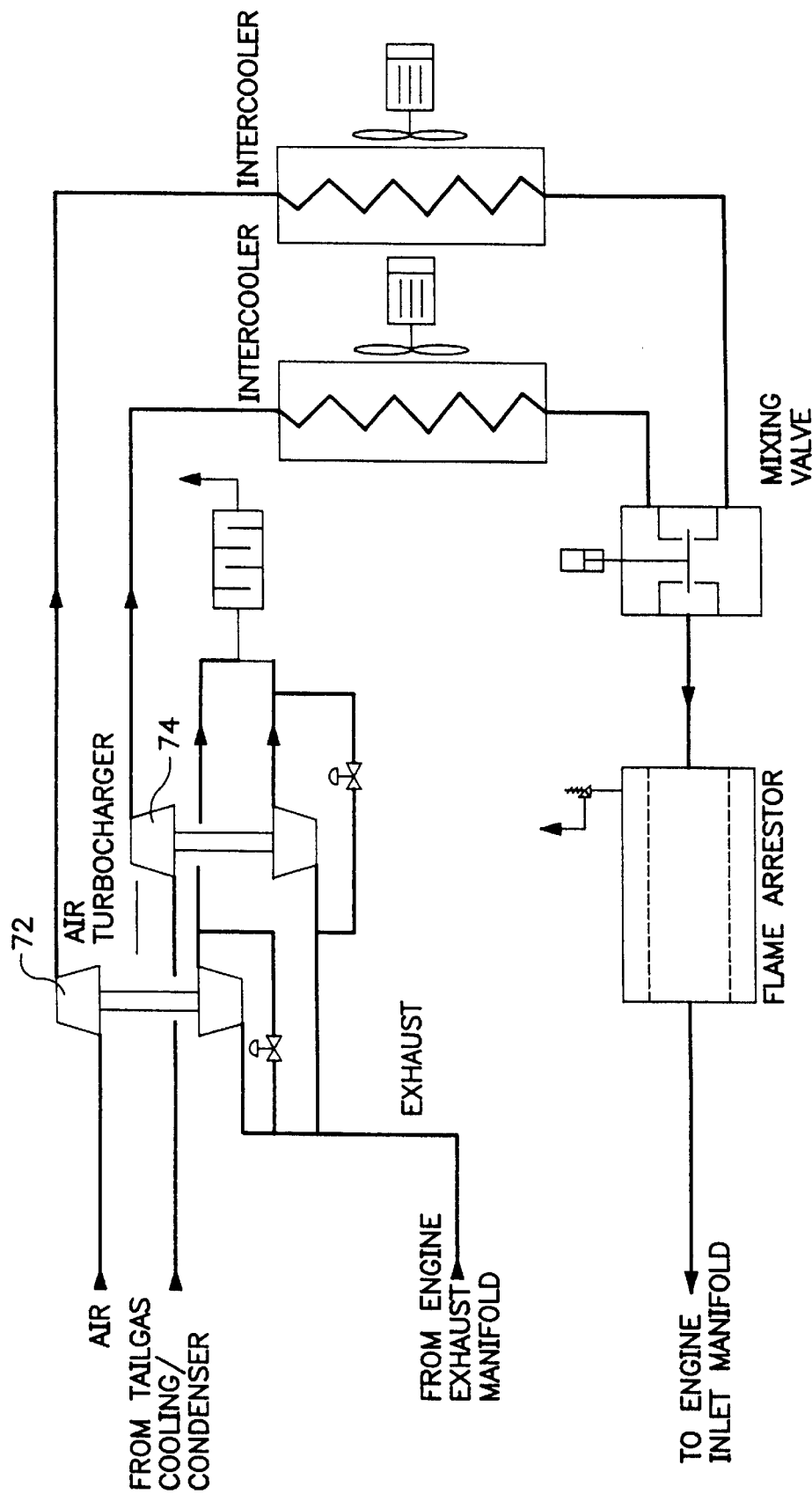
FIG. 6 is a process flow diagram of an alternative embodiment for turbocharging and mixing of gaseous streams.

In both the spark ignition and compression ignition embodiments of the invention as depicted FIGS. 1A–1C and 2A–2C, the process of compressing the tailgas/air mixture has been shown with the mixing of the tailgas and air first. followed by compression in a single turbocharger. In another alternative embodiment of the invention, referring to FIG. 6, the tailgas and the combustion air are pressurized separately in turbochargers 72 and 74 before the intercooling and mixing steps (the sequence of the mixing and intercooling are immaterial as well). The mixing before turbocharging allows for a better mixing of the tailgas/air mixture while the mixing after allows for shorter runs of piping containing a combustible mixture of gases.

Figure 7:
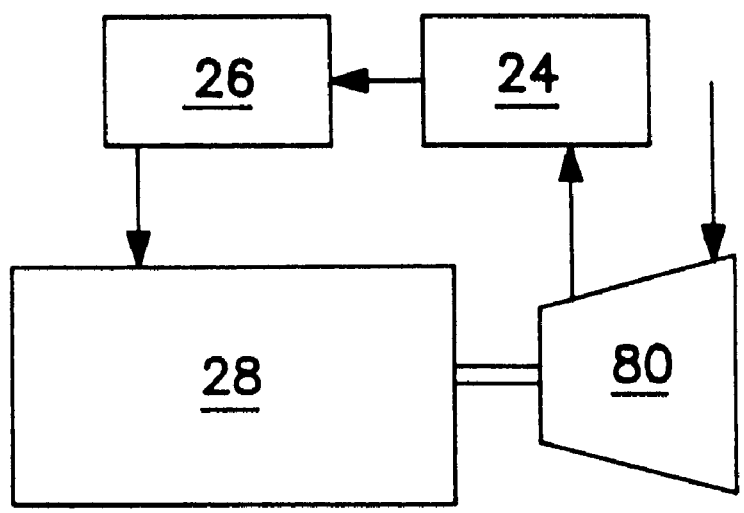
FIG. 7 is a process flow diagram of an alternative embodiment for supercharging the fuel gas.

The pressure charging of the fuel gas into the engine has been described in the preferred embodiment with reference to turbocharging. It is also possible to pressure charge the intake air by supercharging. Referring to FIG. 7, the drive shaft of the engine 28 is used to drive a compressor 80 which supercharges the fuel gas. The supercharged fuel gas flows through the intercooler 24, the flame arrester 26 and into the engine 28.

The foregoing description has been limited to a specific embodiment of the invention. It will be apparent, however, that variations and modifications can be made to the invention, with the attainment of some or all of the advantages of the invention. Therefore, it is the object of the appended claims to cover all such variations and modifications as come within the true spirit and scope of the invention.

Having described our invention, what we now claim is:

1. A process for the formation of a fuel gas and the use of that fuel gag in a reciprocating engine which comprises;
    treating a low specific heating value gas comprising carbon monoxide, hydrogen and inert gas to increase the heating value to form a treated gas;
    mixing the treated gas with combustion air to form a fuel gas;
    pressure charging the fuel gas;
    flowing the pressurized fuel gas to the engine and igniting the same; and
    deriving useful work from the reciprocating engine.

2. The process of claim 1 wherein the step of pressure charging the fuel gas comprises:
    supercharging the fuel gas with a compressor; and
    using the reciprocating engine to drive the compressor.

3. The method of claim 2 which comprises:
    flowing the fuel gas through an intercooler prior to the fuel gas flowing into the engine.

4. The method of claim 3 which comprises:
    cooling the fuel gas by flowing the same through the intercooler.

5. The method of claim 3 which comprises:
    supplementing the fuel gas with an auxiliary fuel.

6. The method of claim 5 wherein the auxiliary fuel is selected from the group consisting of natural gas, propane or similar LPG fuel and combustion air and the reciprocating engine is a spark ignition engine.

7. The method of claim 5 wherein the auxiliary fuel is diesel fuel, heavy fuel oil or other conventional diesel engine fuel and the engine is a compression ignition engine.

8. The method of claim 3 wherein the low specific heating value gas includes water vapor and wherein the treating step further comprises:
    removing water vapor from the gas.

9. The process of claim 1 wherein the step of pressure charging the fuel gas comprises:
    turbocharging the fuel gas with a turbocharger; and
    driving the turbocharger with the exhaust from the engine.

10. A system for the formation of a fuel gas and the use of that fuel gas in a reciprocating engine which comprises:
    means for treating a low specific heating value gas, the gas comprising carbon monoxide, hydrogen and inert gas to increase the heating value of the gas and to form a treated gas;
    means for mixing the treated gas with combustion air to form a fuel gas;
    means for flowing the fuel gas through a pressure charger to increase the mass flow of the fuel gas, said pressure charger downstream of the means for mixing the treated gas; and
    means downstream of the pressure charger for introducing the turbocharged fuel gas into the engine and igniting the fuel gas to drive the engine.

11. The system of claim 10 wherein the means for flowing the fuel gas through a pressurizer comprises:
    means for supercharging the fuel gas with a compressor; and
    means for using the engine to drive the compressor.

12. The system of claim 11 which comprises:
    an intercooler upstream of the engine and downstream of the turbocharger; and
    means for placing the fuel gas into heat exchange relationship with the intercooler.

13. The system of claim 12 wherein the intercooler comprises:
    means for cooling the fuel gas.

14. The system of claim 12 which comprises:
    means for supplementing the fuel gas with an auxiliary fuel.

15. The system of claim 14 wherein the auxiliary fuel supply is diesel fuel and the engine is a compression ignition engine.

16. The system of claim 12 which includes:
    means for removing water vapor from the low specific heating value gas.

17. The system of claim 12 wherein the fuel gas comprises hydrogen and carbon monoxide each being present in an amount of between about 6.5–12%.

18. The system of claim 12 wherein the low specific heating value gas is a range of 55–65 Btu and the means for treating said gas comprises:
    means for increasing the heating value to a range of 90–110 Btu.

19. The system of claim 10 wherein the means for flowing the fuel gas through a pressure charger comprises:
    turbocharging the fuel gas with a turbocharger; and
    means for driving the turbocharger with the exhaust from the engine.

20. The system of claim 19 wherein the auxiliary fuel is selected from the group consisting of natural gas and combustion air and the reciprocating engine is a spark ignition engine.

* * * * *